(12) United States Patent
Tamstorf et al.

(10) Patent No.: US 8,674,988 B2
(45) Date of Patent: Mar. 18, 2014

(54) SYSTEM AND METHOD FOR ARTIST FRIENDLY CONTROLS FOR HAIR SHADING

(75) Inventors: Rasmus Tamstorf, Los Angeles, CA (US); Iman Sadeghi, LaJolla, CA (US); Charles T. Tappan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 603 days.

(21) Appl. No.: 12/802,612

(22) Filed: Jun. 9, 2010

(65) Prior Publication Data

US 2011/0304623 A1 Dec. 15, 2011

(51) Int. Cl.
*G06T 15/50* (2011.01)

(52) U.S. Cl.
USPC .......................................... 345/426

(58) Field of Classification Search
None
See application file for complete search history.

(56) References Cited

U.S. PATENT DOCUMENTS

| | | | | |
|---|---|---|---|---|
| 7,880,744 B2* | 2/2011 | Bruderlin et al. | ............. | 345/581 |
| 8,325,185 B2* | 12/2012 | Kimura et al. | ................ | 345/426 |
| 2005/0099421 A1* | 5/2005 | Guo et al. | ..................... | 345/426 |
| 2009/0289940 A1* | 11/2009 | Kimura et al. | ................ | 345/426 |

OTHER PUBLICATIONS

Stephen R. Marschner, Henrik Wann Jensen, Mike Cammarano, Steve Worley, and Pat Hanrahan. 2003. Light scattering from human hair fibers. ACM Trans. Graph. 22, 3 (Jul. 2003), 780-791.*
Ying Song, Xin Tong, Fabio Pellacini, and Pieter Peers. 2009. SubEdit: a representation for editing measured heterogeneous subsurface scattering. In ACM SIGGRAPH 2009 papers (SIGGRAPH '09), Hugues Hoppe (Ed.). ACM, New York, NY, USA, , Article 31 , 10 pages.*
Arno Zinke, Martin Rump, Tomás Lay, Andreas Weber, Anton Andriyenko, and Reinhard Klein. 2009. A practical approach for photometric acquisition of hair color. ACM Trans. Graph. 28, 5, Article 165 (Dec. 2009), 9 pages.*
Xu, K., Gao, Y., Li, Y., Ju, T., and Hu, S.-M. 2007. Real-time homogenous translucent material editing. Computer Graphics Forum 26, 3, 545-552.*
Apodaca, T., Gritz, L., Lancaster, T., Prater, M., and Bredow, R. 2000. Advanced Renderman 2: to Ri Infinity and Beyond. Siggraph 2000 Course 40.
Apodaca, T., Gritz, L., Pharr, M., Hery, C., Bjorke, K., and Treweek, L. 2001. Advanced Renderman 3: Render Harder. Siggraph 2001 Course 48.
Apodaca, T., Gritz, L., Pharr, M., Goldman, D., Landis, H., Quaroni, G., and Bredow, R. 2002. Renderman in Production. Siggraph 2002 Course 16.
Bonneel, N., Paris, S., Van De Panne, M., Durand, F., and Drettakis, G. 2009. Single Photo Estimation of Hair Appearance. Computer Graphics Forum (Proceedings of the Eurographics Symposium on Rendering).

(Continued)

*Primary Examiner* — Daniel Hajnik
(74) *Attorney, Agent, or Firm* — Farjami & Farjami LLP (57) ABSTRACT

There is provided a system and method for artist friendly control of three-dimensional object shading, particularly hair. A methodology is disclosed for deriving a pseudo scattering function over a domain of Artist Friendly Controls (AFCs) from a physically based scattering function over a domain of Physically Based Controls (PBCs). The pseudo scattering function can provide intuitive decoupled adjustments of specific important visual characteristics while still providing a convincing and aesthetically pleasing result. An end user such as an artist may thus control the values, or AFCs, to implement specific aesthetic features for the shading of objects as seen on a display. The pseudo scattering function may be utilized for single scattering and multiple scattering models of hair shading.

18 Claims, 7 Drawing Sheets

(56) References Cited

OTHER PUBLICATIONS

Bustard, H. K., and Smith, R. W. 1991. Investigation Into the Scattering of Light by Human Hair. Applied Optics, 3485-3491.

Ducheneaut, N., Wen, M.-H., Yee, N., and Wadley, G. 2009. Body and Mind: A Study of Avatar Personalization in Three Virtual Worlds. In Chi '09: Proceedings of The 27th International Conference on Human Factors in Computing Systems, Acm, New York, Ny, Usa, 1151-1160.

Goldman, D. B. 1997. Fake Fur Rendering. In Siggraph '97: Proceedings of The 24th Annual Conference on Computer Graphics and Interactive Techniques, Acm Press/Addison-Wesley Publishing Co., New York, Ny, Usa, 127-134.

Kajiya, J. T., and Kay, T. L. 1989. Rendering Fur With Three Dimensional Textures. In Siggraph '89: Proceedings of The 16th Annual Conference on Computer Graphics and Interactive Techniques, Acm, New York, Ny, Usa, 271-280.

Kim, T.-Y. 2002. Modeling, Rendering and Animating Human Hair. Phd Thesis, Los Angeles, Ca, Usa.

Marschner, S. R., Jensen, H. W., Cammarano, M., Wor- Ley, S., and Hanrahan, P. 2003. Light Scattering From Human Hair Fibers. In Siggraph '03: Acm Siggraph 2003 Papers, Acm, New York, Ny, Usa, 780-791.

Mihashi, T., Tempelaar-Lietz, C., and Borshukov, G. 2003. Generating Realistic Human Hair for "The Matrix Reloaded". In Siggraph '03: Acmsiggraph 2003 Sketches & Applications, Acm, New York, Ny, Usa, 1-1.

Moon, J. T., and Marschner, S. R. 2006. Simulating Multiple Scattering in Hair Using a Photon Mapping Approach. In Sig-Graph '06: Acm Siggraph 2006 Papers, Acm, New York, Ny, Usa, 1067-1074.

Moon, J. T., Walter, B., and Marschner, S. 2008. Efficient Multiple Scattering in Hair Using Spherical Harmonics. In Siggraph '08: Acm Siggraph 2008 Papers, Acm, New York, Ny, Usa, 1-7.

Neulander, I. 2004. Quick Image-Based Lighting of Hair. In Siggraph '04: Acm Siggraph 2004 Sketches.

Paris, S., Chang, W., Kozhushnyan, O. I., Jarosz, W., Matusik, W., Zwicker, M., and Durand, F. 2008. Hair Photobooth: Geometric and Photometric Acquisition of Real Hairstyles. In Siggraph '08: Acm Siggraph 2008 Papers, Acm, New York, Ny, Usa, 1-9.

Petrovic, L., Henne, M., and Anderson, J. 2005. Volumetric Methods for Simulation and Rendering of Hair. Tech. Report 06-08, Pixar.

Robbins, C. R. 1994. Chemical and Physical Behavior of Human Hair, Third Ed.

Stamm, R. F., Garcia, M. L., and J.Fuchs, J. 1977. The Optical Properties of Human Hair I. Fundamental Considerations and Goniophotometer Curves. J. Soc. Cosmet. Chem., 571-600.

Ward, K., Bertails, F., Kim, T.-Y., Marschner, S. R., and Cani, M.-P. 2007. A Survey on Hair Modeling: Styling, Simulation, and Rendering. Ieee Transactions on Visualization and Computer Graphics 13, 2, 213-234.

Zinke, A., and Weber, A. 2006. Global Illumination for Fiber Based Geometries. In Ibero-American Symposium on Computer Graphics—Siacg.

Zinke, A., and Weber, A. 2007. Light Scattering From Filaments. Ieee Transactions on Visualization and Computer Graphics 13, 2, 342-356.

Zinke, A., G., S., and Weber, A. 2004. Photo-Realistic Rendering of Blond Hair. In Proceedings of the Vmv.

Zinke, A., Yuksel, C., Weber, A., and Keyser, J. 2008. Dual Scattering Approximation for Fast Multiple Scattering in Hair. In Siggraph '08: Acm Siggraph 2008 Papers, Acm, New York, Ny, Usa.

Zinke, A., Rump, M., Lay, T., Weber, A., Andriyenko, A., and Klein, R. 2009. A Practical Approach for Photometric Acquisition of Hair Color. In Siggraph Asia '09: Acm Siggraph Asia 2009 Papers, Acm, New York, Ny, Usa, 1-9.

\* cited by examiner

SYSTEM AND METHOD FOR ARTIST FRIENDLY CONTROLS FOR HAIR SHADING

BACKGROUND OF THE INVENTION

1. Field of the Invention

The present invention relates generally to computer generated graphics. More particularly, the present invention relates to shading for three-dimensional computer generated graphics.

2. Background Art

Providing aesthetically pleasing visual results for three-dimensional computer generated graphics is an important and challenging task. As entertainment media such as movies and video games increasingly rely on three-dimensional computer generated graphics to supplement or replace live action footage or traditional painting techniques, it becomes important to streamline the computer aided workflow process. By providing artists and other creative professionals with intuitive computer based tools that ease the transition from ideas to computer generated renderings, visually appealing three-dimensional graphics can be more easily integrated into creative media while adhering to project budgets and schedules.

In particular, most three-dimensional characters, such as humans or animals, will have some kind of hair or fur on their bodies needing to be rendered. Human vision is very sensitive to the appearance of hair and can detect subtle inaccuracies in its appearance. Moreover, since hair can provide a very personal expression of style and creativity, hair is often considered one of the most important customization features for avatars, such as for online social communities and gaming networks. Thus, the importance of providing aesthetically pleasing hair is not to be overlooked.

On the other hand, rendering hair is not a trivial matter as it is computationally expensive to model the complex behavior of light scattering events in a volume of hair. While there has been much research on hair shading using physical models, it is difficult for computer graphics rendering to benefit from such research. Since the rendering parameters are based on physical material properties such as indices of refraction and absorption coefficients, it is difficult for artists and other creative professionals to manipulate the rendering parameters to achieve a specific aesthetic goal. In particular, due to the laws of physics and the coupling of physical material properties to multiple visual effects, it is difficult to create specific aesthetic changes, such as adjusting only the width of hair highlights, without changing the appearance of the rendering as a whole.

Thus, while physically based shading models can provide realistic and aesthetically pleasing results, they are often inappropriate for creative works due to their unintuitive art direction behavior. As a result, ad-hoc shaders that are more easily manipulated by artists have become common in production use. However, such ad-hoc shaders may lack the richness of detail provided by physical shaders, thereby providing a sub-optimal aesthetic appearance that may also break down in certain lighting conditions.

Accordingly, there is a need to overcome the drawbacks and deficiencies in the art by providing a three-dimensional computer graphics rendering system capable of producing aesthetically pleasing results for features such as hair while providing intuitive manipulation controls for art direction.

SUMMARY OF THE INVENTION

There are provided systems and methods for artist friendly control of three-dimensional object shading, particularly hair, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for artist friendly control of three-dimensional object shading, particularly hair. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Before discussing the artist friendly controls provided by the present invention, it may be helpful to provide a brief overview of the state of the art in different shading models. As discussed in the background art, while physically based shader models may provide realistic and aesthetically pleasing hair rendering, they are difficult for artists to utilize since the control parameters are based on unintuitive physical material parameters. Such physical material parameters define the behavior of a material in response to light. These parameters may include an absorption coefficient, an extinction coefficient, a scattering coefficient and an index of refraction. However, artists are not interested in these parameters but in specific visual parameters such as color and brightness. To affect changes in specific visual parameters, artists using physical shader models must manually tweak physical parameters using trial and error, a tedious and time consuming process. Moreover, since the physical parameters are often coupled to several visual parameters, it is difficult to adjust one visual element in isolation without affecting others, which is highly undesirable behavior for art direction.

Although methods exist to extrapolate estimated physical parameters from photographic sources, thereby relieving artists from much of the trial and error of parameter selection, the requirement for photographic source material in the first instance is burdensome, particularly for fantastic and futuristic world designs requiring rendering of objects that have no analogues in the real world. If physical shader models are used, it may be difficult or impossible to implement desired art direction without undesirable rendering side effects or artifacts. Thus, artists are unduly restricted from expressing creative world designs that may not necessarily comply with realistic physical models.

As a result, many production environments have turned to ad-hoc shading models better suited to art direction. Many of these ad-hoc shaders are based on simplified shading models with more intuitive control parameters compatible with art direction. However, as discussed in the background art, the tradeoff is forfeiting the richness in visual detail and consistency in different lighting conditions inherently provided by physically based shading models. Thus, while ad-hoc shaders are easier for artists to control, they may provide sub-optimal visual quality.

Since the highly detailed and aesthetically pleasing results inherent in physically based shading models still remain compelling despite difficulties in art direction control, it may be a good starting point to return to focus on physically based shading models. Physically based scattering functions ($f_s$) may be defined over the domain of material properties, or Physically Based Controls (PBC), which include parameters such as index of refraction η, absorption coefficient $\sigma_a$, and other parameters as discussed above. Thus, $$f_s = f(\omega_i, \omega_r, \sigma_a, \eta, \ldots) = f(\omega_i, \omega_r, \{PBC\})$$

where $\omega_i$ and $\omega_r$ are lighting and viewing directions. From this physical model, the goal is to produce a pseudo scattering function $f'_s$ that approximates $f_s$ but is defined on a different domain of parameters that have intuitive visual meanings for artists and are separate for all visually meaningful components. This domain of intuitive, decoupled, and meaningful parameters shall be referred to as Artist Friendly Controls (AFC). Thus, $$f'_s = f(\omega_i, \omega_r, \{AFC\}) \approx f_s$$

Since the pseudo scattering function $f'_s$ is an approximation of $f_s$, it is not limited to the rules of physics and can generate a larger range of appearances such as super-natural appearances, allowing artists to more faithfully reproduce their creative visions that may include values beyond the possible range of physical models. Of course, if a more realistic rendering is desired, then $f'_s$ may also provide a closer approximation of $f_s$ as well.

Figure 1:
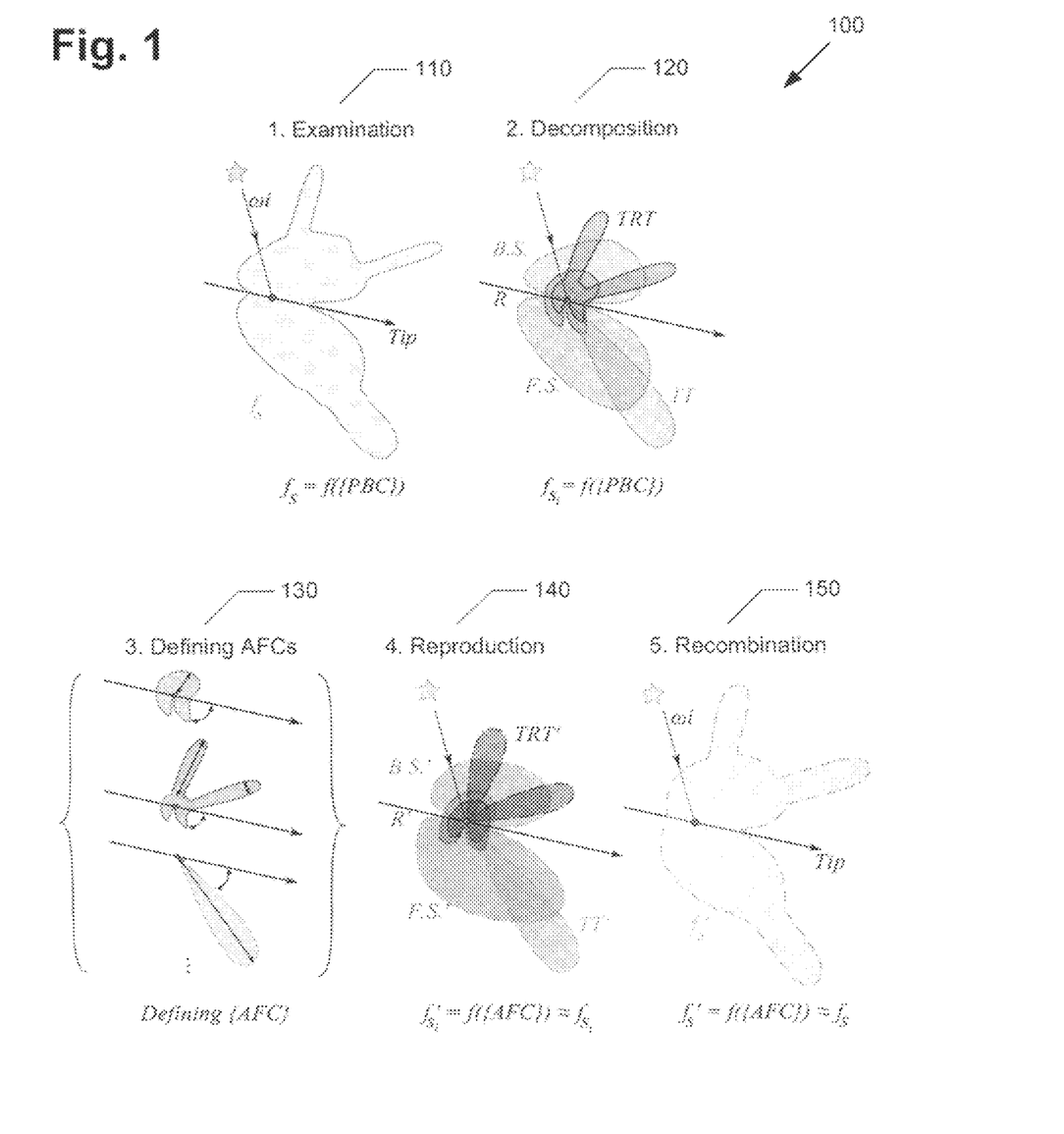
FIG. 1 presents a diagram showing the steps for deriving, from a physically based scattering function over a domain of Physically Based Controls (PBCs), a pseudo scattering function over a domain of Artist Friendly Controls (AFCs), according to one embodiment of the present invention.

FIG. 1 presents a diagram showing the steps for deriving, from a physically based scattering function over a domain of Physically Based Controls (PBCs), a pseudo scattering function over a domain of Artist Friendly Controls (AFCs), according to one embodiment of the present invention. As shown in diagram 100 of FIG. 1, deriving $f'_s$ from $f_s$ may be summarized as a five-step process. At step 110 or the first step, the exact behavior of $f_s$ is examined over the domain of some material properties {PBC}. At step 120 or the second step, the behavior of $f_s$ is decomposed into visually separate and meaningful scattering sub-functions $f_{si}$. Since the definition of "meaningful" in this context is subjective, this step should take into account the input of end users or artists who will be using the new shader. At step 130 or the third step, for each subcomponent $f_{si}$, artist friendly control parameters $AFC_{ij}$ should be defined that are intuitive, decoupled, and visually meaningful. Again, since "visually meaningful" is subjective, the input of the end users or artists should be integrated into step 130. At step 140 or the fourth step, pseudo scattering functions $f'_{si}$ are reproduced that approximate the qualitative behavior of the decomposed scattering functions $f_{si}$ from step 120 over the domain of $\{AFC_{ij}\}$ from step 130. At step 150 or the fifth step, the pseudo scattering functions $f'_{si}$ from step 140 are combined into a single pseudo scattering function $f'_s$, which approximates $f_s$ but is defined over the domain of artist friendly control parameters $\{AFC_{ij}\}$.

While the process described in steps 110-150 of FIG. 1 are specifically applied to hair shading, the process is not limited to hair only. The results of FIG. 1 may also be generically applied to other fiber-like structures. Additionally, by adjusting the process to account for the light scattering behavior of other objects, those other objects can also be analyzed and rendered using a similarly derived pseudo scattering function, enabling greater art direction while maintaining the visual appeal of physical based shader models for a wide variety of object materials.

Figure 2A:
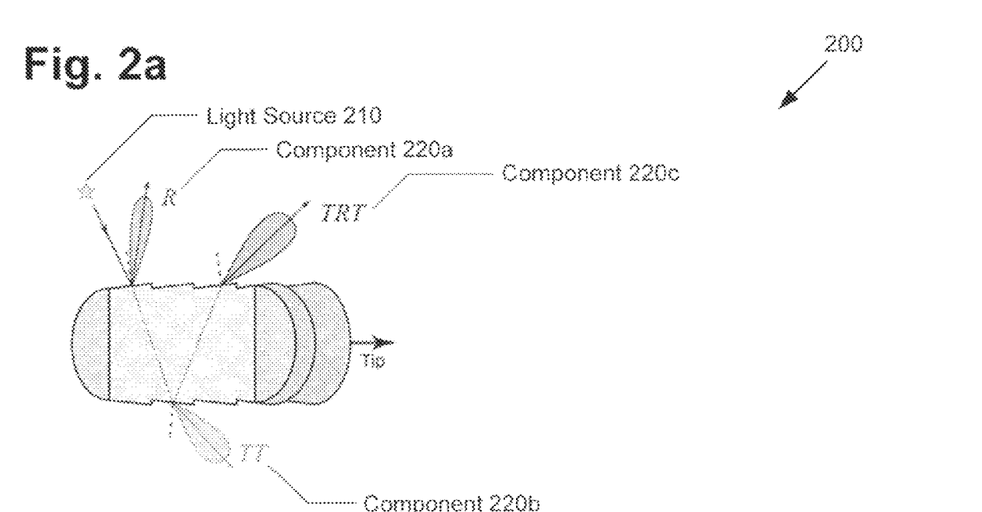
FIGS. 2a through 2c present diagrams showing the single scattering subcomponents of light related to a single fiber of hair.
Figure 2B:
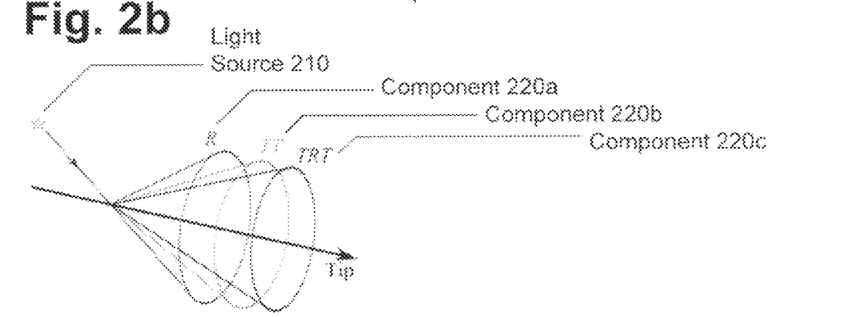
Figure 2C:
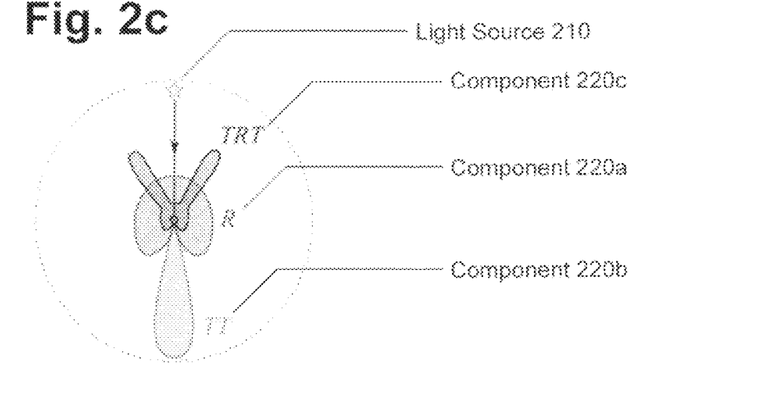

Moving to FIGS. 2a through 2c, FIGS. 2a through 2c present diagrams showing single scattering subcomponents of light as applied to one or more fibers of hair, where each of the subcomponents controls a different visually apparent characteristic of the one or more fibers. To explain the simpler case first, the five-step process described in diagram 100 of FIG. 1 will be first applied to the single scattering case, where a single hair fiber is to be rendered using a light source. Thus, corresponding to step 110 of FIG. 1, the exact light scattering behavior of a single hair fiber will be examined. Diagram 200 of FIGS. 2a through 2c each includes light source 210 and components 220a, 220b, and 220c. The arrow indicates the tip of the hair fiber, as shown. As is known in the art, the single scattering of light source 210 from a single hair fiber has three main subcomponents, as shown in FIG. 2d:

1) Component 220a or "R": Light reflecting off the surface of hair or the "primary highlight"
2) Component 220b or "TT": Light transmitted through hair medium or the "transmission highlight"
3) Component 330c or "TRT": Light internally reflected off the inner surface of hair or the "secondary highlight"

Due to the presence of tilted cuticles, components 220a through 220c will be reflected in three different angles around the hair fiber, forming three different cones. Component 220a has the color of the light source and usually appears as a bright white highlight. Component 220b appears in backlit situations and is the bright halo around the hair. Component 220c appears above the primary highlight and has the color of the hair. Component 220c contains some randomized looking sharp peaks that are basically caustics formed as the light passes through the hair fibers. The randomized appearance is due to the fact that hairs have elliptical cross sections and are oriented randomly.

As is known in the art, components 220a through 220c can be decomposed into three longitudinal functions M(θ), depicted in FIG. 2b, and three azimuthal functions N(θ), depicted in FIG. 2c. Thus, $$f_s(\theta, \phi) = \sum_X M_X(\theta) N_X(\phi) / \cos^2 \theta$$

where subscript $X \in \{R, TT, TRT\}$ represents one of the three subcomponents from components 220a through 220c.

The longitudinal scattering functions $M_x(\theta)$ have been modeled as unit-integral, zero-mean Gaussian functions. The variance of these Gaussian functions represents the longitudinal width of each highlight:

$$M_X(\theta) = g(\beta_X^2, \theta_h - \alpha_X)$$

where g is a unit-integral, zero-mean Gaussian function and $\beta^2$ represents the variance of the lobe and $\alpha_x$ represents its longitudinal shift. By assuming circular cross sections for the hair fibers when computing the azimuthal scattering functions, the final shape of the scattering functions is relatively easy to characterize, as shown in FIG. 2c.

Proceeding with step 120 of FIG. 1, a team of artists was consulted to derive a desired list of controllable appearance properties. The results came up as four components: the primary highlight, the secondary highlight, glints, and the rim light when the hair is backlit. Advantageously, these components happened to align with the underlying physically based calculations fairly closely. The primary highlight corresponds to R or component 220a, the rim light corresponds to TT or component 220b, and the glints and the secondary highlight correspond to sub-components of TRT or component 220c.

Proceeding with step 130 of FIG. 1, the team of artists was again consulted to define decoupled and meaningful Artist Friendly Controls or AFCs. These correspond to specific visual qualities such as color, intensity, size, shape, and position. The results came up as follows:

1) R, or component 220a:
   Color, intensity, longitudinal position, longitudinal width
2) TT, or component 220b:
   Color, intensity, longitudinal position, longitudinal width, azimuthal width
3) TRT minus glints, or a portion of component 220c:
   Color, intensity, longitudinal position, longitudinal width
4) Glints, or the remainder of component 220c:
   Color, intensity, frequency of appearance As previously described, since the results of steps 120 and 130 are subjective and based on artist preferences, they may vary depending on the specific needs of the artists.

Proceeding with step 140 of FIG. 1, the current task is to reproduce the decomposed subcomponents described in step 120 based on the AFCs defined in step 130. Since separate longitudinal and azimuthal scattering functions for single scattering are already known in the art as described above, they will be used for this purpose. However, since it is desirable to decouple width and brightness so that adjusting the width of highlights does not affect brightness, unit height Gaussian functions will be used rather than unit-area.

Thus, the pseudo longitudinal scattering function is defined as follows:

$$M'_X(\theta) = g'(\beta^2_X, \theta_h - \alpha_X)$$

where $X \in \{R, TT, TRT\}$ and g' is a unit-height zero-mean Gaussian function and $\beta_x$ represents the longitudinal width of component X and $\alpha_x$ is its longitudinal shift.

Figure 3:
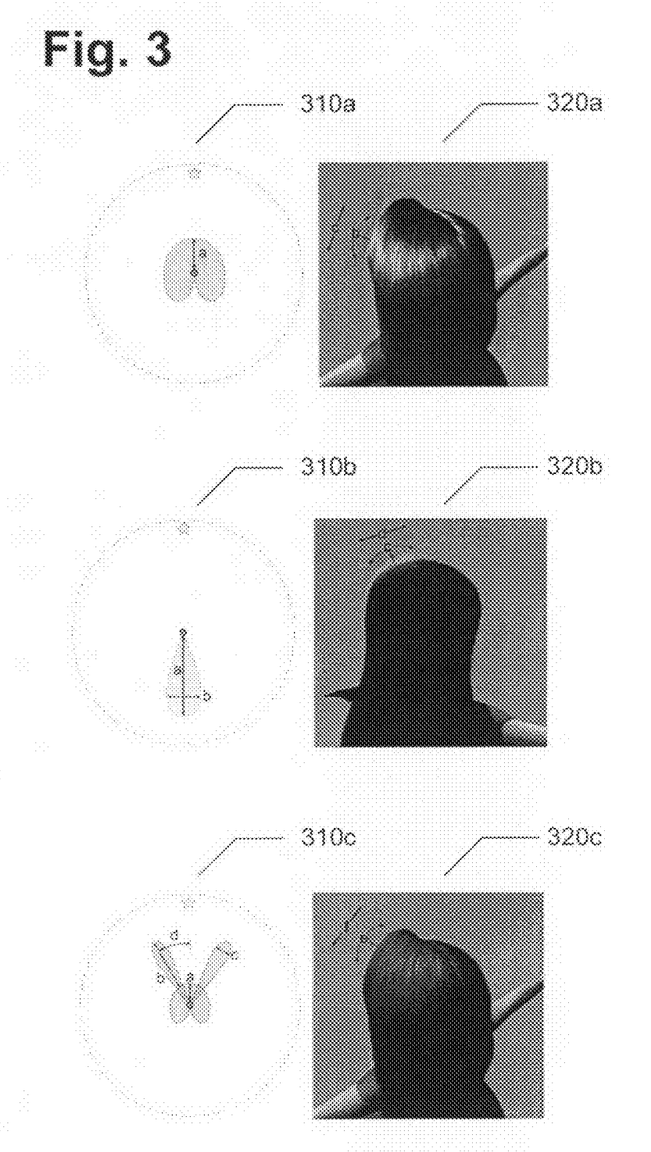
FIG. 3 presents azimuthal visualizations of the Artist Friendly Controls (AFCs) for a single scattering model of hair rendering, according to one embodiment of the present invention.

Moving to FIG. 3, FIG. 3 presents azimuthal visualizations of the Artist Friendly Controls (AFCs) as applied to a single scattering model of hair rendering, according to one embodiment of the present invention. The azimuthal scattering functions are more complex than the longitudinal scattering functions and will need to be simulated separately, as shown in diagrams 310a through 310c with corresponding renderings 320a through 320c.

The azimuthal scattering function for the primary highlight $N_r(\phi)$ appears as an up-side down heart shape, as shown in diagram 310a of FIG. 3. In diagram 310a and render 320a, the "a" term indicates the intensity $I_R$, the "b" term indicates the longitudinal shift $\alpha_R$, and the "c" term indicates the longitudinal width $\beta^2_R$ of the primary highlight. A simple approximation of the shape ignoring the Fresnel term is provided as follows:

$$N'_R(\phi) = \cos(\phi/2) \quad 0 < \phi < \pi$$

The azimuthal scattering function for the transmission component $N_{TT}$ appears as a sharp forward directed lobe, as shown in diagram 310b of FIG. 3. In diagram 310b and render 320b, the "a" term indicates the intensity $I_{TT}$, the "b" term indicates the azimuthal width $\gamma^2_{TT}$, the "c" term indicates the longitudinal shift $\alpha_{TT}$, and the "d" term indicates the longitudinal width $\beta^2_{TT}$ of the transmission highlight. A reproduction of the shape is provided using a Gaussian with unit height and controllable azimuthal width as follows:

$$N'_{TT} = g'(\gamma^2_{TT}, \pi - \phi)$$

where $\gamma^2_{TT}$ is the azimuthal width of the transmission component.

The azimuthal scattering function for the secondary highlight and the glints appears as shown in diagram 310c of FIG. 3. In diagram 310c and render 320c, the "a" term indicates the intensity of the secondary highlight $I_{TRT}$, the "b" term indicates the relative intensity of glints $I_g$, the "c" term indicates the azimuthal widths of the glints $\gamma^2_g$, the "d" term indicates the half angle between the glints $G_{angle}$, the "e" term indicates the longitudinal shift $\alpha_{TRT}$, and the "f" term indicates the longitudinal width $\beta^2_{TRT}$ of the secondary highlight.

For the secondary highlight, more control parameters are present because of the glints. Due to the eccentricity of the human hair fibers, the number, intensity, and the azimuthal direction of the glints varies based on the orientation of each hair. However, since only the final visual impact of the glints is of importance, it may be assumed that glints are two sharp peaks with the same intensity that are always coming back towards the incoming light direction. A random shift may be added to the azimuthal direction to provide a randomized appearance. This simplified model produces visually acceptable results with greatly simplified rendering calculations and sufficient artist control over important glint properties, namely relative brightness over the secondary highlight and frequency of appearance. Thus, $$N'_{TRT-G} = \cos(\phi/2)$$

$$N'_G = I_g g'(\gamma^2_g, G_{angle} - \phi)$$

$$N'_{TRT} = N'_{TRT-G} + N'_G$$

where $I_g$ is the relative intensity of glints over the intensity of the secondary highlight and $\gamma^2_g$ is the azimuthal widths of the glints. Increasing the azimuthal widths increases the frequency of glint appearance, whereas decreasing the azimuthal widths reduces the frequency of glint appearance. $G_{angle}$ is the half angle between the glints, which may be randomized for each hair strand between 30 and 45 degrees to provide a randomized appearance to the glints.

To provide color and brightness control for each component, it suffices to simply multiply each component by a scalar variable and a color variable. Thus, $$f'_X = C_X I_X M'_X(\theta) N'_X(\phi)$$

where $X \in \{R, TT, TRT\}$ and $C_x$ and $I_x$ are the color and intensity of component X, respectively. These values can be controlled manually, procedurally, or through painted maps.

Proceeding with step 150 of FIG. 1, the components are recombined by adding them together and dividing by $\cos^2$ to account for the projected solid angle of the specular cone. Thus, the following equation is used with the components described in step 140:

$$f'_s = \sum_X f'_X / \cos^2(\theta)$$

As a result, the final pseudo scattering function $f'_s$ is derived for the single scattering case.

Unfortunately, single scattering is often inadequate to provide the correct perception of hair color, particularly for light colored hair. Thus, multiple scattering models are preferred to provide accurate representation of hair color. Beginning with step 110 of FIG. 1, the exact behavior of hair with multiple scattered light shall be examined. However, to capture the exact behavior of multiple scattered light, brute force path tracing or ray tracing is required, which is computationally very expensive and requires a long time to converge to a result. Although alternative methods such as photon-mapping and grid-based approaches are available, they are still relatively computationally expensive.

However, by taking into consideration the physical properties of human hair, an approximation of the multiple scattering components can be provided by the Dual Scattering model, which is fast and relatively accurate. Thus, the Dual Scattering model will be adopted to apply the steps of diagram 100 in FIG. 1 for multiple scattering. The Dual Scattering method approximates the multiple scattering function as a combination of two components, or global multiple scattering and local multiple scattering.

Global multiple scattering accounts for light reaching the neighborhood of the shading point, and is dependent on the orientation of all the hairs between the light source and the point. It requires calculating the forward scattering transmittance and spread of the light that reaches the shading point from all light sources. Global multiple scattering will be computed for different points separately.

Local multiple scattering approximates the scattering events within the local neighborhood of the shading point, and is only dependent on the longitudinal inclination of the hair strand at the shading point, assuming that all surrounding hairs around the shading region have the same orientation and are infinite.

Figure 4A:
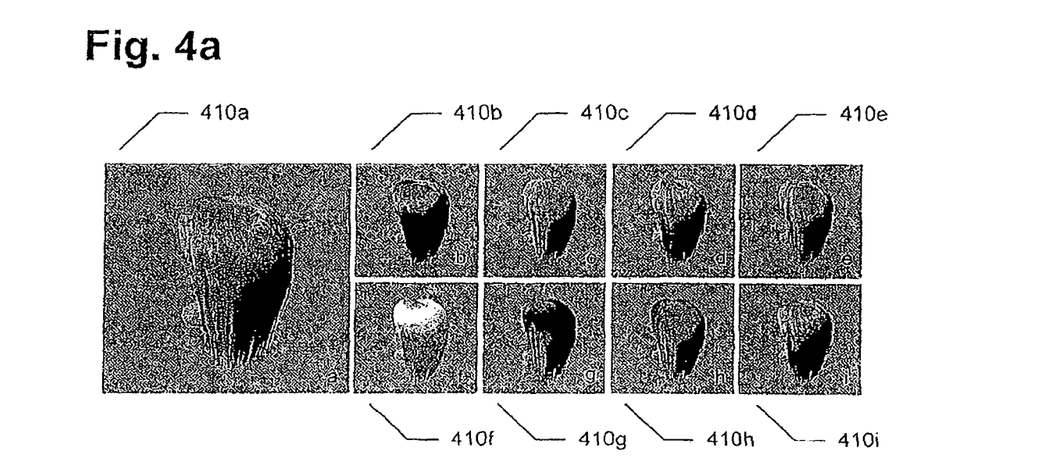
FIG. 4a presents diagrams showing multiple scattering components of light for a volume of hair, according to one embodiment of the present invention.

Moving to FIG. 4a, FIG. 4a presents diagrams showing multiple scattering components of light as applied to a volume of hair, according to one embodiment of the present invention, wherein each of the subcomponents controls a different visually apparent characteristic of the volume of hair. Render 410a shows the final result of the Dual Scattering method, render 410b shows the single scattering components $f_s$, render 410c shows the average back scattering attenuation $A_b$, render 410d shows the multiple backscattering distribution function for direct lighting $f^{direct}_{back}$, render 410e shows the multiple backscattering distribution function for indirect lighting $f^{scatter}_{back}$, render 410f shows the average backscattering spread $S_b$, render 410g shows single scattering for indirect lighting $f^{scatter}_s$, render 410h shows the $F^{scatter}$ term, and render 410i shows the $F^{direct}$ term.

Proceeding with step 120 of FIG. 1, the team of artists was again consulted to derive a desired list of controllable appearance properties. Unfortunately, step 120 is not straightforward for multiple scattering when compared to single scattering. The team of artists was presented with visualizations of all the terms involved in the computation of the final dual scattering model, as shown in renders 410b through 410i of FIG. 4a.

The results from the team of artists came up as two components:
1) Forward Scattering component (F.S.), which includes the $f^{scatter}_s$ term and computes the light that scatters forward and maintains its forward directionality inside the hair volume. This component is particularly important in back-lit situations.
2) Backscattering component (B.S.), which includes the terms $f^{direct}_{back}$ and $f^{scatter}_{back}$. These are multiple backscattering distribution functions that represent the light that goes into the hair volume and comes back to the surface. $f^{direct}_{back}$ computes this quantity for direct and $f^{scatter}_{back}$ computes this for indirect illumination. Both of these components are smooth Gaussian functions in the Dual Scattering model.

It should be noted that $f^{scatter}_{back}$ and $f^{direct}_{back}$ are very similar quantities corresponding to the well-known $f_{back}$ quantity. $f^{direct}_{back}$ is being used in the computation of $F^{direct}$ term while $f^{scatter}_{back}$ is being used in the computation of $f^{scatter}$ and accounts for the variance of forward scattering in the longitudinal directions $\bar{\sigma}_{ff}^2$, as shown in render 420d and 420e in FIG. 4b.

Figure 4B:
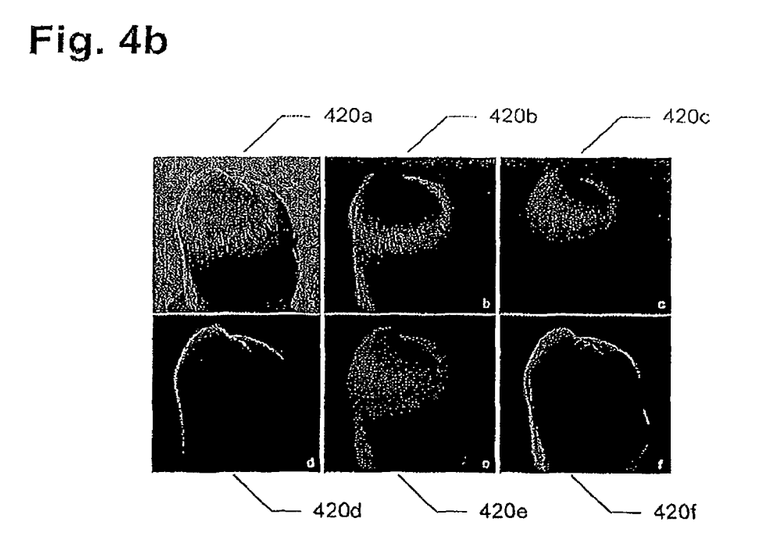
FIG. 4b presents visualizations of the Artist Friendly Controls (AFCs) for a multiple scattering model of hair rendering, according to one embodiment of the present invention.

Moving to FIG. 4b, FIG. 4b presents visualizations of the Artist Friendly Controls (AFCs) as applied to a multiple scattering model of hair rendering, according to one embodiment of the present invention. Render 420a shows the final rendering result $f'_s$, render 420b shows the primary highlight component R', render 420c shows the secondary highlight component TRT', render 420d shows the transmission component TT', render 420e shows the backscattering component B.S.', and render 420f shows the forward scattering component F.S.'.

Proceeding with step 130 of FIG. 1, since the visual components such as color, intensity, size, shape, and position of the decomposed components are already indirectly affected by the values chosen for the single scattering components, it may be counterproductive to simply override these values. Therefore, rather than overriding variables, adjustment control parameters are provided instead. The artist team provided the following AFCs:
1) F.S.: Color adjust, intensity adjust
2) B.S.: Color adjust, intensity adjust, longitudinal shift adjust, longitudinal width adjust By setting these parameters to default non-adjusting values, the original result of the dual scattering model is the result. If, however, the artist wants to adjust particular parameters, the artist is enabled to do so using the above AFCs. As previously discussed, since steps 120 and 130 are subjective, the results may differ depending on the needs of the artists.

Proceeding with steps 140 and 150 of FIG. 1, the original algorithm for the Dual Scattering model is utilized, substituting the single scattering component $f_s^{direct}$ with the above described pseudo scattering function $f'_s$ and embedding the defined artist controls from step 130 into the $f^{direct}_{back}$, $f^{scatter}_{back}$, and $f_s^{scatter}$ components. However since $f'_s$ is only an approximation of the physical based $f_s$ and may therefore break physical energy conservation laws, unwanted artifacts such as blooming colors or disappearing objects may result. To adjust for this, the computations for the dual scattering model are instead calculated on the normalized version of the single scattering components, or $f'^{norm}_s$:

$$f'^{norm}_s(\theta, \phi) = \frac{f'_s(\theta, \phi)}{\int_\Omega f'_s(\theta', \phi') d\theta' d\phi'}$$

where $\Omega$ is the full sphere around the shading point.

Combining all of the above, the pseudo code shown below implements steps 140 and 150 by reproducing the results of dual scattering with embedded artist controls.

```
// Precompute A̅_b(θ), Ā_b(θ), and σ̄_b²(θ) from f_s^norm for 0 < θ < π
F(T_f, σ̄_f², directFraction)
 //Backscattering for direct and indirect lighting
 f_back^direct ⇐ 2A̅_b(θ)g(θ_h − Ā_b(θ) + α_Back, σ̄_b²(θ) + β_Back)/(π cos²θ)
 f_back^scatter ⇐ 2A̅_b(θ)g(θ_h − Ā_b(θ) + α_Back, σ̄_b²(θ) + σ̄_f²(θ) +β_Back)/
   (π cos²θ)
 f_back^direct ⇐ C_Back I_Back f_back^direct
 f_back^scatter ⇐ C_Back I_Back f_back^scatter
 //Longitudinal functions for direct and indirect lighting
 M'_X ⇐ g'(θ_h − α_X, β_X²)
 M_X^G ⇐ g'(θ_h − α_X, β_X² + σ̄_f²)
 //Azimuthal functions for indirect lighting
 N_X^G(θ, φ) ⇐ (2/π) ∫_{π/2}^π N'_X(θ, φ') dφ'
 //Single scattering for direct and indirect lighting
 f_s^direct ⇐ Σ M'_X N'_X(θ, φ)
 f_s^scatter ⇐ Σ M_X^G N_X^G(θ, φ)
 f_s^scatter ⇐ C_Forward I_Forward f_s^scatter
 F^direct ⇐ directFraction (f_s^direct + d_b f_back^direct)
 Fscatter ⇐ (T_f − directFraction) d_f (f_s^scatter + πd_b f_back^scatter)
 // Combine the direct and indirect scattering components
 return (F^direct + F^scatter) cos θ_i
```

The symbols used in the pseudo code are well known for the Dual Scattering algorithm, and include $\bar{A}_b$ for the average backscattering attenuation, $\bar{A}_b$ for the average longitudinal shift, $\bar{\sigma}_b^2$ for the average backscattering variance, $T_f$ for the front scattering transmittance, and $\bar{\sigma}_f^2$ for the front scattering variance. $M_X^G$ and $N_X^G$ are the averaged forward scattered longitudinal and azimuthal scattering functions, respectively.

The terms $M'_x$ and $N'_x$ are the pseudo scattering functions corresponding to the longitudinal and azimuthal scattering functions respectively, as described above. Corresponding to the adjustments described above in step 130, $I_{Forward}$ and $I_{Back}$ are control parameters for adjusting the intensity values, while $C_{Forward}$ and $C_{Back}$ are control parameters for adjusting the color values of the forward scattering and backscattering components respectively. Finally, $\beta_{Back}$ and $\alpha_{Back}$ are control parameters for adjusting the longitudinal shift and the longitudinal width of the back scattering components.

One problem that arises is since the multiple scattering computations are based on the single scattering functions, there arises an inherent relationship between the components as multiple scattering is basically the effect of many single scattering events. As previously discussed, such coupling leads to unintuitive and undesirable behavior for art direction. To address this problem, two sets of parameters may be provided, one that feeds into the single scattering and one that feeds into the multiple scattering, which may be linked by default but also severed at will by artists.

Figure 5:
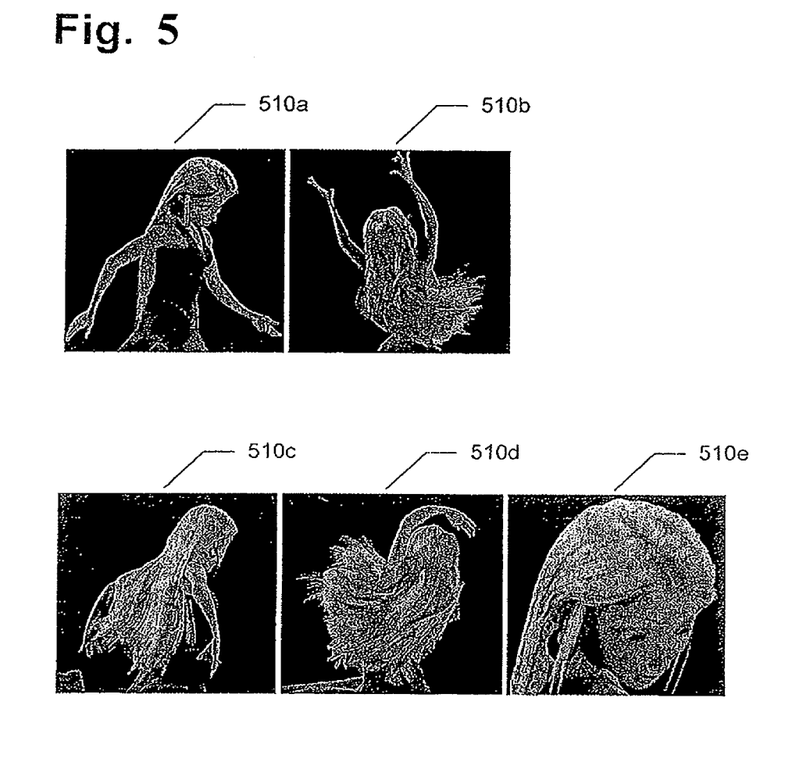
FIG. 5 presents final display renders of a character under different lighting and viewpoints using a pseudo scattering function over a domain of Artist Friendly Controls (AFCs) as applied to hair, according to one embodiment of the present invention.

Moving to FIG. 5, FIG. 5 presents final display renders of a character under different lighting and viewpoints using a pseudo scattering function over a domain of Artist Friendly Controls (AFCs) as applied to hair, according to one embodiment of the present invention. As shown by renders 510a through 510e, the newly developed shader using AFCs holds up well in different viewing angles and lighting conditions, which is not always the case with ad-hoc shaders, which may break down and show artifacts and anomalies in certain lighting situations.

According to preliminary user evaluations, the new shader using AFCs provides better art direction, lighting appearance, and photographic reference matching compared to physical based shaders or ad-hoc production shaders. Additionally, as example advantages of shaders according to various embodiment of the present invention, the rendering performance has been measured to be around 3.3 times faster than the ad-hoc production shader and 1.5 times faster than a physical based research shader. Moreover, shaders according to various embodiment of the present invention require less memory, with the production shader requiring 1.3 times more memory and the research shader requiring 1.6 times more memory. This leads to faster rendering turn-around times and allows production to proceed on more modest hardware, tighter budgets, and accelerated schedules.

Figure 6:
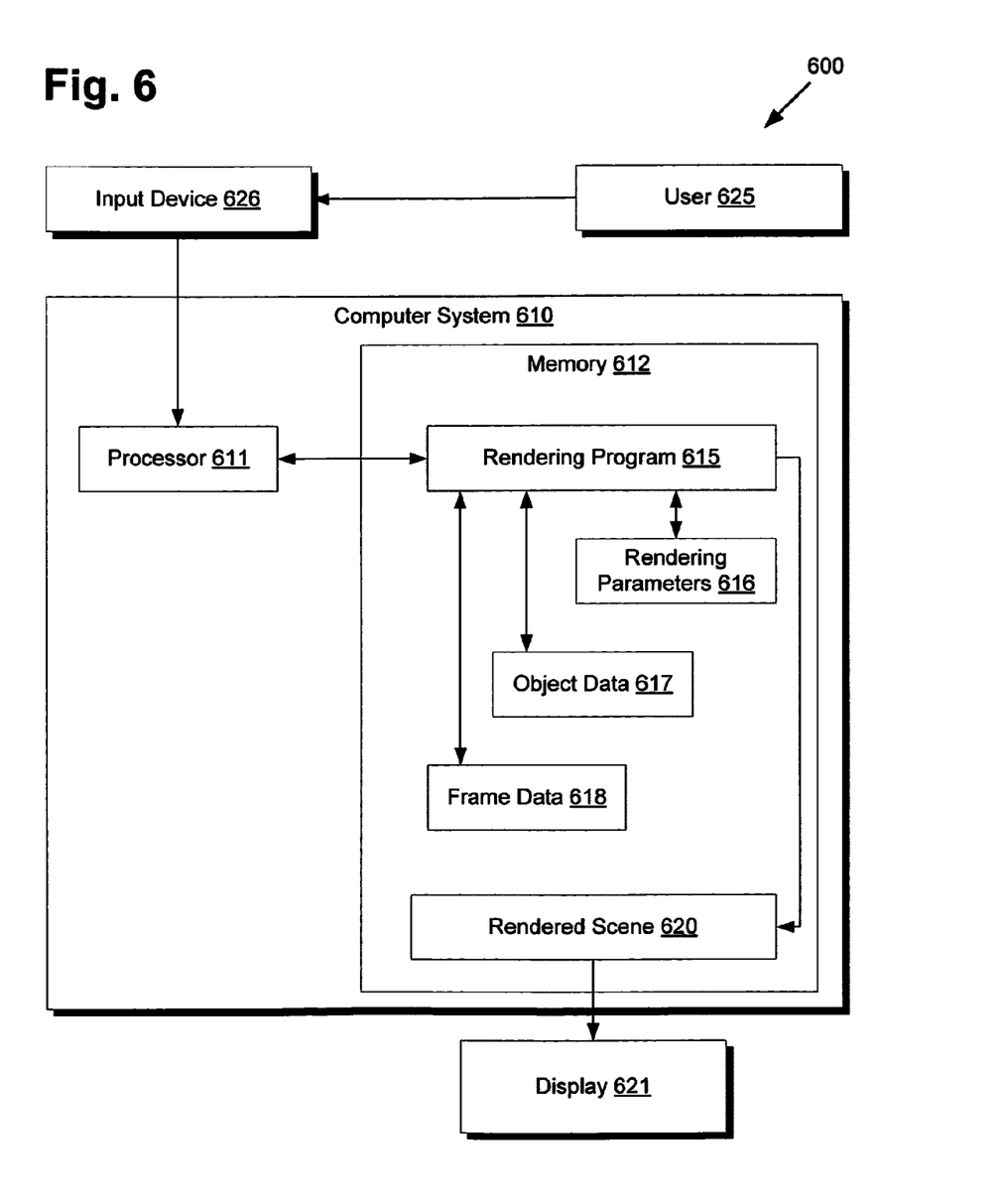
FIG. 6 presents a diagram of a computer system by which a user can adjust Artist Friendly Controls (AFCs) in a shading system to create and display a render of a fiber or volume of fibers, such as hair, according to one embodiment of the present invention.

Moving to FIG. 6, FIG. 6 presents a diagram of a computer system by which a user can adjust Artist Friendly Controls (AFCs) in a shading system to create and display a render of a fiber or volume of fibers, such as hair, according to one embodiment of the present invention. Diagram 600 of FIG. 6 includes computer system 610, display 621, user 625, and input device 626. Computer system 610 includes processor 611 and memory 612. Memory 612 includes rendering program 615, rendering parameters 616, object data 617, frame data 618, and rendered scene 620.

For example, user 625 may comprise the end user or artist, input device 626 may comprise a keyboard, mouse, pen tablet, or other input device, and computer system 610 may comprise a workstation or server computer. While only a single computer system 610 is shown in FIG. 6, it is understood that computer system 610 may share data and processing resources with other servers, for example for distributed workload sharing.

Processor 611 may be executing rendering program 615, which may comprise a three-dimensional graphics rendering system and user interface such as PhotoRealistic RenderMan by Pixar and Autodesk Maya. Using input device 626, user 625 may manipulate the values stored in rendering parameters 616, which may correspond to the Artist Friendly Controls (AFCs) as discussed above. Rendering program 615 may then use object data 617, which may include object models and textures, and frame data 618, which may include camera and lighting settings, to generate rendered scene 620, which may comprise a still frame or an animated sequence of frames. Through the use of native or plug-in functionality, rendering program 615 may use a pseudo scattering function shader as described above for the rendering of hair and other fibers on characters and other objects. As previously described, similar pseudo scattering functions may be developed for other materials, which rendering program 615 may support as well. Rendered scene 620 may then be output to display 621, where user 625 can review the rendering results. If user 625 deems the rendering results adequate, then the settings in memory 612 may be stored in a more permanent fashion, such as in non-volatile memory, to be rendered by rendering servers in high quality for movie applications, or to be used as asset data for real-time applications such as online gaming.

Figure 7:
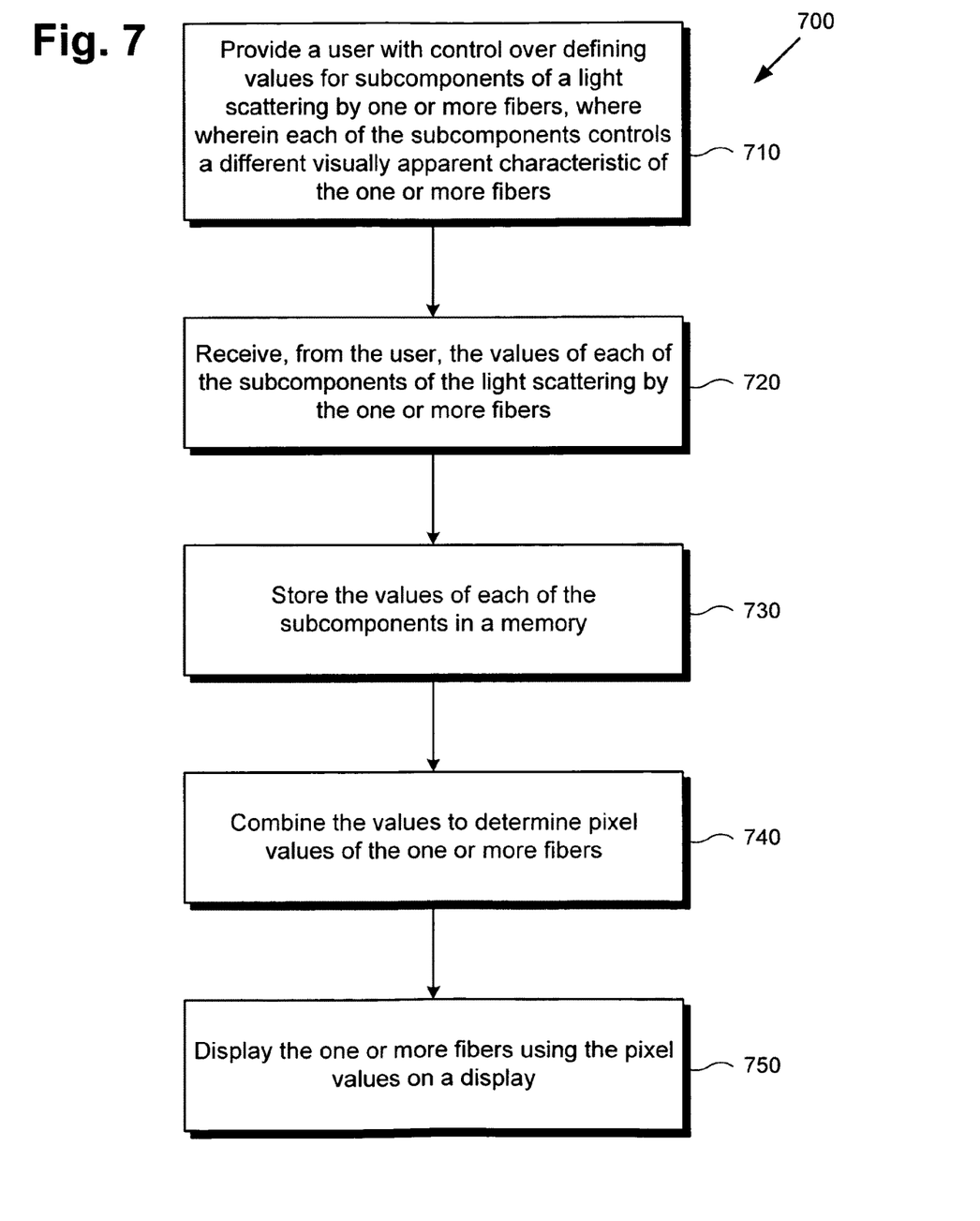
FIG. 7 shows a flowchart describing the steps, according to one embodiment of the present invention, by which a computer system provides for a user to adjust Artist Friendly Controls (AFCs) in a shading system to create and display a desired render of a single fiber, such as hair.

Moving to FIG. 7, FIG. 7 shows a flowchart describing the steps, according to one embodiment of the present invention, by which a computer system provides for a user to adjust Artist Friendly Controls (AFCs) in a shading system to create and display a desired render of a single fiber, such as hair. While flowchart 700 is directed towards a single fiber, flowchart 700 may also be adapted to a volume of fibers or other materials, as described above. Certain details and features have been left out of flowchart 700 that are apparent to a person of ordinary skill in the art. For example, a step may comprise one or more substeps or may involve specialized equipment or materials, as known in the art. While steps 710 through 750 indicated in flowchart 700 are sufficient to describe one embodiment of the present invention, other embodiments of the invention may utilize steps different from those shown in flowchart 700.

Referring to step 710 of flowchart 700 in FIG. 7 and diagram 600 of FIG. 6, step 710 of flowchart 700 comprises processor 611 of computer system 610 providing user 625 with control over defining values for subcomponents of a light scattering by one or more fibers, where each of the subcomponents controls a different visually apparent characteristic of the one or more fibers. Specifically, the one or more fibers may be one or more hair fibers. The one or more fibers may be stored as an object in object data 617, and the values for the subcomponents may be stored in rendering parameters 616. As previously described, rendering program 615 may implement a pseudo scattering function over a domain of Artist Friendly Controls (AFCs). Thus, for single scattering, the subcomponents may include R, TT, TRT as previously described, and TRT may be further decomposed into two subcomponents including (1) glints, and (2) the TRT excluding the glints. For multiple scattering, the subcomponents may further include F.S. and B.S., as previously described.

Referring to step 720 of flowchart 700 in FIG. 7 and diagram 600 of FIG. 6, step 720 of flowchart 700 comprises processor 611 of computer system 610 receiving, from user 625, the values of each of the subcomponents of the light scattering by the one or more fibers from step 710. For example, user 625 may use input device 626 to adjust such values by manually typing in values, by adjusting sliders or other user interface widgets, by providing a procedure or macro for procedurally generated values, or by using other methods to set the values. Since the AFCs are defined to be intuitive, decoupled, and meaningful, adjusting the values in step 720 leads to predictable and art directed visual changes in the shading of the fiber, providing user 625 with greater creative control.

Referring to step 730 of flowchart 700 in FIG. 7 and diagram 600 of FIG. 6, step 730 of flowchart 700 comprises processor 611 of computer system 610 storing the values of each of the subcomponents from step 720 into memory 612. As previously described, the values may more specifically be stored within rendering parameters 616, for future use by rendering program 615.

Referring to step 740 of flowchart 700 in FIG. 7 and diagram 600 of FIG. 6, step 740 of flowchart 700 comprises processor 611 of computer system 610 combining the values stored in step 730 to determine pixel values of the single fiber or one or more fibers. Based on a desired representation of the color spectrum, a pixel may include a number of bits, such as bits representing RGB values. Rendering program 615 implements steps 140 and 150 from FIG. 1, as previously described, to generate rendered scene 620. More specifically, the values provided by user 625 and stored in memory 612 directly affect the specific visual parameters listed in step 740. In a multiple scattering model, adjustment parameter values may also influence the visual result seen in rendered scene 620, and separate values may be provided for the single and multiple scattering portions, as previously described.

Referring to step 750 of flowchart 700 in FIG. 7 and diagram 600 of FIG. 6, step 750 of flowchart 700 comprises processor 611 of computer system 610 displaying rendered scene 620 from step 740 on display 621, where rendered scene 620 includes using the pixel values to display the single fiber or one or more fibers having the properties determined in step 740, such as a color, an intensity, a longitudinal position and a longitudinal width of the one or more fibers. In other words, the render is sent to display 621 for user 625 to perceive and review. If the user is not satisfied with the result shown in display 621, the user may return to step 720 to further adjust the values of the subcomponents until a desired aesthetic result is achieved.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A shading method for use by a computer system having a processor and a memory, the method comprising:
providing, using the processor, a user with control over separately defining values for each of the subcomponents of a light scattering by one or more fibers using a user interface, wherein each of the subcomponents controls a different visually apparent characteristic of the one or more fibers;
receiving, using the processor, from the user, the values of each of the subcomponents of the light scattering by the one or more fibers;
storing, using the processor, the values of each of the subcomponents in the memory;
combining, using the processor, the values of each of the subcomponents to determine pixel values for the one or more fibers; and
displaying, using the processor, the one or more fibers using the pixel values on a display;
wherein the one or more fibers are hair or fur fibers, and wherein the subcomponents of the light include:
a light that reflects off an outer surface of the one or more fibers ("R");
a light that has transmitted through the one or more fibers ("TT"); and
a light that has been internally reflected off an inner surface of the one or more fibers ("TRT").

2. The method of claim 1, wherein the TRT is decomposed into two subcomponents including glints and the TRT excluding the glints.

3. The method of claim 1, wherein properties of the one or more fibers include any of a color, an intensity, a longitudinal position and a longitudinal width, which is beyond a possible range of a physical based shader model applied to the one or more fibers.

4. The method of claim 1, wherein displaying includes rendering a color, an intensity, a longitudinal position and a longitudinal width of the one or more fibers.

5. The method of claim 1, wherein the user is provided with a direct control over defining the values.

6. The method of claim 1 further comprising:
providing, using the processor, the user with control over separately defining values for each of the subcomponents of the light scattering by a volume of fibers using the user interface, wherein each of the subcomponents of the light scattering by the volume of fibers controls a different visually apparent characteristic of the volume of fibers;
receiving, using the processor, from the user, the values of each of the subcomponents of the light scattering by the volume of fibers;
storing, using the processor, the values of each of the subcomponents of the light scattering by the volume of fibers in the memory;
combining, using the processor, the values of each of the subcomponents of the light scattering by the volume of fibers to determine pixel values of the volume of fibers; and
displaying, using the processor, the volume of fibers using the pixel values of the volume of fibers on a display;
wherein the volume of fibers is a volume of hair or fur fibers, and wherein the subcomponents of the light scattering by the volume of fibers include:
a light that scatters forward and maintains its forward directionality inside the volume of fibers ("FS"); and
a light that goes into the volume of fibers and comes back to a surface of the volume of fibers ("BS").

7. The method of claim 6, wherein properties of the volume of fibers include any of a color, an intensity, a longitudinal position and a longitudinal width, which is beyond a possible range of a physical based shader model applied to the volume of fibers.

8. The method of claim 6, wherein displaying includes rendering a color, an intensity, a longitudinal position and a longitudinal width of the volume of fibers.

9. The method of claim 6, wherein the user is provided with a direct control over defining the values for each of the subcomponents of the light scattering by the volume of fibers.

10. A computer system enabling a user to control a shading of one or more fibers on a display, the computer system comprising:
a memory; and
a processor configured to:
provide the user with control over separately defining values for each of the subcomponents of a light scattering by the one or more fibers using a user interface, wherein each of the subcomponents controls a different visually apparent characteristic of the one or more fibers;
receive, from the user, the values of each of the subcomponents of the light scattering by the one or more fibers;
store the values of each of the subcomponents in the memory;
combine the values of each of the subcomponents to determine pixel values for the one or more fibers; and
display the one or more fibers using the pixel values on the display;
wherein the one or more fibers are hair or fur fibers, and wherein the subcomponents of the light include:
a light that reflects off an outer surface of the one or more fibers ("R");
a light that has transmitted through the one or more fibers ("TT"); and
a light that has been internally reflected off an inner surface of the one or more fibers ("TRT").

11. The system of claim 10, wherein the TRT is decomposed into two subcomponents including glints and the TRT excluding the glints.

12. The system of claim 10, wherein properties of the one or more fibers include any of a color, an intensity, a longitudinal position and a longitudinal width, which is beyond a possible range of a physical based shader model applied to the one or more fibers.

13. The system of claim 10, wherein displaying includes rendering a color, an intensity, a longitudinal position and a longitudinal width of the one or more fibers.

14. The system of claim 10, wherein the user is provided with a direct control over defining the values.

15. The system of claim 10, wherein:
the processor is further configured to:
provide the user with control over separately defining values for each of the subcomponents of a light scattering by the volume of fibers using the user interface, wherein each of the subcomponents of the light scattering by the volume of fibers controls a different visually apparent characteristic of the volume of fibers;
receive, from the user, the values of each of the subcomponents of the light scattering by the volume of fibers;
store the values of each of the subcomponents of the light scattering by the volume of fibers in the memory;
combine the values of each of the subcomponents of the light scattering by the volume of fibers to determine pixel values of the volume of fibers; and
display the volume of fibers using the pixel values of the volume of fibers on the display;
wherein the volume of fibers is a volume of hair or fur fibers, and wherein the subcomponents of the light scattering by the volume of fibers include:
a light that scatters forward and maintains its forward directionality inside the volume of fibers ("FS"); and
a light that goes into the volume of fibers and comes back to a surface of the volume of fibers ("BS").

16. The system of claim 15, wherein properties of the volume of fibers include any of a color, an intensity, a longitudinal position and a longitudinal width, which is beyond a possible range of a physical based shader model applied to the volume of fibers.

17. The system of claim 15, wherein displaying includes rendering a color, an intensity, a longitudinal position and a longitudinal width of the volume of fibers.

18. The system of claim 15, wherein the user is provided with a direct control over defining the values for each of the subcomponents of the light scattering by the volume of fibers.

* * * * *